United States Patent [19] [11] Patent Number: 5,811,897
Spaude et al. [45] Date of Patent: Sep. 22, 1998

[54] DEVICE FOR THE BODY-BOUND DATA TRANSMISSION BETWEEN TWO TERMINALS

[75] Inventors: Heinz-Werner Spaude, Aichtal; Ronald Heuthe, Neckarwestheim; Christian Kranawetter, Stadtbergen, all of Germany

[73] Assignee: Daimler-Benz AG, Germany

[21] Appl. No.: 771,199

[22] Filed: Dec. 20, 1996

[30] Foreign Application Priority Data

Dec. 20, 1995 [DE] Germany .................. 195 47 560.7

[51] Int. Cl.$^6$ ................................................. H04B 13/00
[52] U.S. Cl. .............................................................. 307/149
[58] Field of Search .................... 307/149, 10.2–10.6; 340/425.5, 426, 573, 825.3–825.32, 825.34, 825.22; 235/492, 384; 382/116, 115, 123

[56] References Cited

U.S. PATENT DOCUMENTS 5,204,672 4/1993 Brooks ............................. 340/825.31

FOREIGN PATENT DOCUMENTS 0109184 10/1983 European Pat. Off. .

OTHER PUBLICATIONS

Patent Abstract of Japan, Patent No. 61–46639(A), dated Mar. 3, 1986.
Patent Abstract of Japan, Patent No. 60–250731(A), dated Dec. 11, 1985.

*Primary Examiner*—Richard T. Elms
*Attorney, Agent, or Firm*—Evenson, McKeown, Edwards & Lenahan, P.L.L.C.

[57] ABSTRACT

The invention provides a device for the transmission of data between two terminals in which a portion of the body of a living being completes the data transmission circuit. A first terminal is to be worn by a body of a living being, and an interface is provided for coupling of data signals into the body and/or for coupling them out of the body. A second terminal has a touch-sensitive interface by way of which, in the case of a contact by the body wearing the first terminal, it couples data signals coupled into the body out of the body and/or couples data signals into the body. According to the invention, the interface of the first terminal has a first pair of electrodes which are to be arranged at mutually spaced points of the body, and the interface of the second terminal has a second pair of touch-sensitive electrodes which are to be touched by two other mutually spaced points of the body. The data signal to be transmitted is coupled by the transmitting terminal by way of its pair of electrodes as a differential voltage signal into the body, and is coupled by the other terminal as a corresponding differential voltage signal by way of its pair of electrodes out of the body.

5 Claims, 1 Drawing Sheet

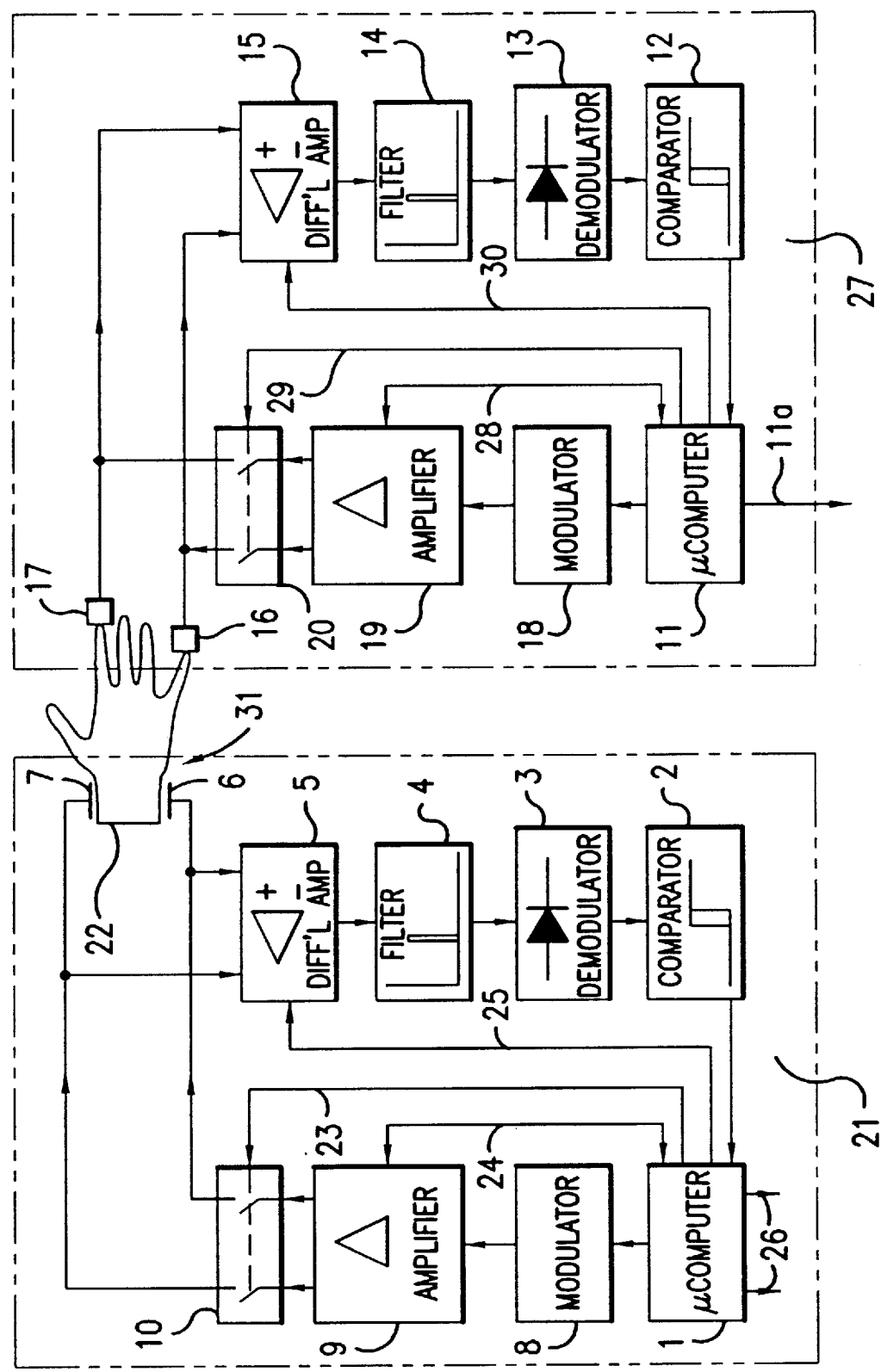

DEVICE FOR THE BODY-BOUND DATA TRANSMISSION BETWEEN TWO TERMINALS

BACKGROUND AND SUMMARY OF THE INVENTION

This invention relates to a device for transmission of data between two terminals, in which a portion of the body of a living being is used to complete the data transmission circuit.

Examples of the use of such data transmission devices are access systems and/or usage authorization systems which grant one or several specific persons access to spaces, technical objects or bank accounts, or which authorize the use of a usable device by only one or several specific persons. For this purpose, such persons are provided with an individualized access or usage authorization code that must be transmitted in each case to prove authorization. Frequently, data transmission devices used for this purpose have a mechanical code data transmission, such as for example, mechanical locking systems. Wireless code data transmission systems, on the other hand, may use magnetic cards or chip cards, or may exchange data by radio or infrared waves. It is known that a problematic aspect of all these systems is their vulnerability to interventions by unauthorized persons.

To increase the system security and the operating comfort, European patent document EP 0 109 184 A2 discloses an identification system of this type which is employed for proving the usage authorization of a respective user and is designed as a single-wire line system. A first terminal is carried by a human body (for example, in the form of a wrist watch), and a second terminal is assigned to a device which is to be activated by a user. The terminal carried on the body is constructed as a transmitter in which a usage authorization code is stored, the latter being coupled as an electric signal by way of an interface designed as a single electrode into the human body carrying the terminal. The interface of the other terminal comprises a single-electrode sensor arrangement which contains a touch-sensitive switching element and an amplifier in parallel thereto. The amplifier is kept activated by the switching element only when a touch contact is detected; in its activated condition, the amplifier couples the signal which is coupled into the body and contains the usage authorization code out of the body. The signal is processed further in switching units which are connected behind the amplifier, where the usage authorization code is compared with a usage authorization code stored in this terminal to determine whether these codes correspond to one another. If so, the associated device is enabled to perform its intended function. A similar system is described in Japanese patent document JP 61-46639 (A).

Japanese patent document JP 60-250731 (A) discloses a device for the body-bound data transmission between two terminals which communicate with one another by way of the body of a living being. For this purpose, a first pair of electrodes is mounted in the ankle area of one leg of the living being, and a second pair of electrodes is mounted in a muscle area of his other leg. The terminals are connected by a two-wire line with a pertaining pair of electrodes. One terminal contains a carrier signal oscillator whose output signal is guided by way of an amplifier into the pertaining two-wire line to the first pair of electrodes. From there it is transmitted by way of the body of the living being to the second pair of electrodes. A receiver of the other terminal receives the signal by way of the pertaining two-wire line. As a function of the received carrier signal, the second terminal will then emit an output signal to the second pair of electrodes for the transmission by way of the body of the living being.

An object of the present invention is to provide a device of the above mentioned type which can be implemented with relatively low hardware expenditures, operates with relatively high precision, has a high operating comfort and effectively protects the system against unauthorized usage.

This object is achieved by the data transmission arrangement according to the invention, in which a two-wire line transmission path is implemented. During operation, the body of a living being carrying a first terminal operates as an electric four-terminal transmission channel which completes the transmission path. That is, the local body region transmits the electric differential voltage signals from a coupling-in pair of electrodes to a coupling-out pair of electrodes. The transmission path is closed when the user carrying the first terminal touches suitable points of his body to a touch-sensitive pair of electrodes of the second terminal, so that the latter pair of electrodes can then couple the corresponding differential voltage signals into or out of the body.

In an advantageous application, for example, the body-borne terminal may be a wrist watch having two electrodes situated opposite one another on the inside of the wrist band. To transmit data, the two electrodes of the other terminal are touched by the finger tips of two different fingers on the hand of the arm wearing the wrist band. This body-bound data transmission device is largely secure against tapping, permits a problem free location of the person authorized to access, and with respect to the stress caused by electricity is uncritical in its application for the body of the living being. The device can therefore be used, for example, to limit access to or the usage of a system assigned to the second terminal to a user who carries an authorizing first terminal at a point provided for this purpose on his body, and touches the pair of electrodes of the second terminal with the suitable points of his body.

In one embodiment of the invention, the authorized person manually closes the transmission path.

A further embodiment permits a bidirectional data exchange between the two terminals, such as for example, for access or usage authorization systems in which an authorization code checking is checked by means of a cryptographic process which uses bidirectional data communication.

Another embodiment of the invention protects the body of the living being bearing the one terminal from excessive electric currents by limiting the current intensity of the differential voltage signal which is coupled into the body, to a predeterminable maximum value.

Other objects, advantages and novel features of the present invention will become apparent from the following detailed description of the invention when considered in conjunction with the accompanying drawings.

BRIEF DESCRIPTION OF THE DRAWINGS

The single FIGURE is a block diagram of a device for the body-bound data transmission between two terminals.

A first terminal 21 of the illustrated device is designed, for example, as a wrist watch intended to be worn on the body, more specifically on the wrist 22 of a user's arm. The first terminal 21 may, for example, be part of a wrist watch 31 with additional functions. Two diametrically opposite electrodes 6, 7 of the first terminal 21 are arranged on the inside of the write band. When the first terminal 21 is worn by the user, the two electrodes 6,7 rest on the skin at points on opposite sides of the wrist. Metal or plastic electrodes or capacitive electrodes, for example, are suitable for use as the electrodes 6, 7. The first terminal 21 contains a transmitter portion as well as a receiver portion, both of which are connected to the pair of electrodes 6, 7.

The transmitter portion has a data-generating unit in the form of a microcomputer 1, and a modulator 8 which modulates the data generated by the microcomputer 1 in a conventional manner (for example, amplitude modulation or frequency shift keying) to a carrier frequency. An amplifier 9 amplifies the modulated carrier frequency to a voltage of approximately 0.5 V and emits it as the differential voltage signal.

A switch 10 which can be controlled by the microcomputer 1 via control line 23, optionally passes the output signal from the amplifier 9 to the pair of electrodes 6, 7 or decouples the pair of electrodes 6, 7 from the output of this amplifier 9. Such decoupling may be useful, for example, when the terminal 21 is receiving—and hence is not transmitting. As an alternative, of course, different carrier frequencies may be used to implement bidirectional data transmission for the two transmitting directions, and to transmit simultaneously in both directions in the full-duplex operation.

The amplifier 9 has conventional devices for measuring the current intensity of the differential voltage signal transmitted from the amplifier to the pertaining pair of electrodes 6, 7. Via a connection line 24, the amplifier 9 reports this current intensity value to the microcomputer 1 which, in turn, controls the amplifier 9 (also via the connection line 24) so that the current intensity remains below a predeterminable maximum value selected as a function of the application, according to criteria of biological tolerability, so as to assure both the safety of the user and reliable signal transmission. Such current intensity control thus permits the data transfer to be adapted optimally to the momentary existing conditions (for example, with respect to a fluctuating coupling-in and/or coupling-out resistance on the pair of electrodes 6, 7) in order to ensure consistent fault free data transmission.

The receiver portion of the first terminal 21 has on its input side, a differential amplifier 5 which is connected with the pair of electrodes 6, 7 and which amplifies the voltage difference arriving by way of the pair of electrodes 6, 7. The differential amplifier 5 can also be controlled by the microcomputer 1 by way of a pertaining control line 25. It contains a band limitation toward low frequencies as well as a high common mode rejection, so that, together with a filter 4, it achieves a desired sufficient interference suppression. The signal filtered in this manner is fed to a demodulator 3 which suppresses the carrier frequency and supplies the demodulated signal to a comparator 2. The comparator 2 generates a specific voltage level from this signal which level represents the data information which is transmitted from the comparator 2 to the microcomputer 1.

The microcomputer 1 appropriately analyzes the arriving data and carries out processing functions as required. Thus, depending on the application, the first terminal 21 may, for example, have an alphanumerical display unit which is controlled by the microcomputer 1. An indicated output signal 26, for example, can display the time and/or data information received by way of the pair of electrodes 6, 7. Of course, the first terminal 21 may have additional function elements, such as data entry keys, etc., as required.

The body bound data transmission device according to the invention also has a second terminal 27, which is generally not worn by the user who is wearing the first terminal 21. Rather, it is assigned, for example, to a controllable technical system, such as a door opener or another actuator. The second terminal 27 has a construction which is largely identical with the construction of the first terminal 21, as indicated by the identical function blocks. Thus, a transmitter portion of the second terminal 27 also has a data-generating microcomputer 11 and a modulator 18. An amplifier 19 is connected by a connection line 28 for the purpose of current intensity acknowledgement and control with the microcomputer 11; and a switch 20 can be controlled by the microcomputer 11 by way of a control line 29. Analogously, the receiver portion in turn comprises a differential amplifier 15 (which can be controlled by the microcomputer 11 by way of a control line 30), a filter 14, a demodulator, and a comparator 12 which emits the data information extracted from the received signal, to the analyzing microcomputer 11. The microcomputer 11 may, for example, have the purpose of controlling an assigned actuator, for example, an electric door opener, as a function of the received data information, by way of an output control line 11a.

Like the first terminal 21, the second terminal 27 contains a pair of electrodes 16, 17 to which the transmitter portion and the receiver portion are connected. In this case, the electrodes 16, 17 of the second terminal 27 are constructed as touch-sensitive elements; when in contact with respective points of the user's body, they can couple a differential voltage signal, which is to be sent, into the adjoining body region, or can couple a differential voltage signal, which is to be received from the user's body, at the corresponding body points. As illustrated in the FIGURE, the electrodes 16, 17 of the second terminal 27 in this example are primarily intended to be touched by different finger tips of the user's hand on which the pair of electrodes 6, 7 of the terminal 21 is worn. When the electrodes 16, 17 of the second terminal 27 are touched by the corresponding body points of the user, the body region between these touching body points (that is, in the illustrated example, the region between the two finger tips of one hand and the two contact points of the pair of electrodes 6, 7 of the terminal 21 worn by the user) completes the data transmission path.

The tissue, blood vessel and bone structure of a human or animal body permit this data transmission function in that the differential voltage signal, which is coupled into the user's body by the transmitting terminal via its pair of electrodes, propagates locally, with a certain degree of attenuation, over the body region to be connected. The attenuated differential voltage signal is then coupled by the other pair of electrodes out of the user's body, amplified again in the following receiver portion, and then analyzed. In the illustrated example, in one data transmission direction, the differential voltage signal is coupled by the first pair of electrodes 6, 7 of the first terminal 21 into the user's body on his one wrist, and is coupled out by the electrodes 16, 17 of the second terminal 27 when the latter is touched by two finger tips of this hand. When the fingers are closer together, such as the index finger and the middle finger, the voltage difference is lower than when fingers are used which are farther apart, such as the thumb and the small finger. On the propagation path between the wrist and the finger tips, the signal is weakened by approximately 30 dB, which causes no difficulty with respect to reliable data transmission using common transmission processes which can be implemented at reasonable cost.

The illustrated device can operate, for example, as an access authorization system in which only one or several authorized persons are to have access to a space which can be locked, such as for example, a motor vehicle. Each authorized user receives a first terminal 21 which is assigned to him, and can be worn on a wrist, and which contains an authorization code that can be generated by the microcomputer 1. The second terminal 27 is assigned to the existing locking device, and has the authorizing code or codes stored in the microcomputer thereof. The locking device can therefore be operated only by an authorized user who is wearing his terminal 21. For this purpose, he simply touches the pair of electrodes 16, 17 of the second terminal 27, with two finger tips of the hand which bears the wrist terminal 21. The pair of electrodes 16, 17 then taps the authorization code information coupled into the hand by the first terminal 21 as a differential voltage signal, and transmits it to the following receiver portion, which extracts the authorization code information therefrom and transmits it to the microcomputer 11. The microcomputer determines whether the received authorization code corresponds to one of the filed authorization codes, and emits a control signal only when a match is determined. The control signal operates the locking device.

This type of a body-bound data transmission, in which a hand or another body part of a living being is used as an electric four-terminal transmission channel, ensures a data transfer which is largely free of faults, and is secure against interception.

Since the transmission path is closed only by contact between the pair of electrodes 16, 17 of the second terminal 27 and the body of an authorized user wearing the first terminal 21, the device offers reliable protection against manipulation attempts by means of wireless transmission signals. In addition, the two-wire method according to the invention also has advantages in comparison to a single-wire method because, in the latter, the body region bound into the data transmission path represents an electric two-terminal system, in which virtually the whole body participates in the current conduction. Because of this usually capacitive short circuit, a precise location of the user is possible only to a limited extent. Thus the single-wire line system can be characterized as largely open to tapping and interference attempts. In contrast, the two-wire technique utilized in the invention results in an only partial current stress to the body region participating in the data transmission, so that the system is largely secure against tapping, and permits precise location of the user.

It is understood that, in addition to the explicitly indicated applications, additional applications of the device according to the invention are possible; for example, wherever for reasons of transmission security, a body-bound uni- or bidirectional data transmission is expedient. When only unidirectional data communication is required, the one terminal, without a receiver portion, can be designed as a pure transmitter and the other terminal, without a transmitter portion, can be designed as a pure receiver. In addition to the described example of a hand as a signal-transmitting body region, as required, this function can naturally also be taken over by another body region of a living being, for example, by a foot region.

Although the invention has been described and illustrated in detail, it is to be clearly understood that the same is by way of illustration and example, and is not to be taken by way of limitation. The spirit and scope of the present invention are to be limited only by the terms of the appended claims.

What is being claimed:

1. Device for transmission of data between two terminals, comprising:

a first terminal adapted to be worn on a body of a living being, and having an interface including a pair of electrodes for coupling electric data signals, at least one of into and out of the body, for transmission via the body; and a second terminal situated on a device for at least one of sending and receiving signals, which device has a touch-sensitive interface including a pair of electrodes which are operative when touched by the body bearing the first terminal, to couple data signals at least one of to and from the first terminal via the body of the living being; wherein the interface of the first terminal has a first pair of electrodes positioned to make contact with a first pair of mutually spaced points of the body;

the interface of the second terminal has a second pair of touch-sensitive electrodes adapted to be touched by a second pair of mutually spaced points of the body; and the electrodes of the first terminal are positioned to make contact with mutually spaced apart points on the body of the living being, and the electrodes of the second terminal are mounted separate from the body and adapted to be contacted by two different appendages of the body;

whereby a data signal to be transmitted by the first terminal is coupled as a differential voltage signal by way of the first pair of electrodes into the body of the living being and is coupled out of the body by the second terminal as a corresponding differential voltage signal by way of the second pair of electrodes.

2. Device according to claim 1, for the data transmission between the terminals, wherein:

said data transmission is bidirectional; and each of the two terminals contains a transmitter part and a receiver part which are connected with one of said pairs of electrodes.

3. Device according to claim 1, wherein at least one of the two terminals has a transmitter portion which contains devices for limiting a current intensity of the differential voltage signal to a predeterminable maximum value.

4. Device for bidirectional transmission of data between two terminals, comprising:

a first terminal adapted to be worn on a body of a living being, and having an interface for the coupling-in and/or coupling-out of electric data signals into and out of the body, for transmission via the body; and a second terminal having a touch-sensitive interface, operative when touched by the body bearing the first terminal, to couple data signals to and from the first terminal via the body of the living being; wherein the interface of the first terminal has a first pair of electrodes positioned to make contact with a first pair of mutually spaced points of the body;

the interface of the second terminal has a second pair of touch-sensitive electrodes adapted to be touched by a second pair of mutually spaced points of the body; and wherein each of the two terminals contains a transmitter part and a receiver part which are connected with one of said pairs of electrodes;

whereby a data signal to be transmitted by the first terminal is coupled as a differential voltage signal by way of the first pair of electrodes into the body of the living being and is coupled out of the body by the receiving terminal as a corresponding differential voltage signal by way of the second pair of electrodes.

5. Device according to claim 4, wherein at least one of the two terminals has a transmitter portion which contains devices for limiting a current intensity of the differential voltage signal to a predeterminable maximum value.

* * * * *